United States Patent
Yrjänä et al.

(10) Patent No.: US 9,510,522 B2
(45) Date of Patent: Dec. 6, 2016

(54) BOOM STRUCTURE

(75) Inventors: Vesa Yrjänä, Iisalmi (FI); Pentti Hukkanen, Kiuruvesi (FI); Jorma Hyvönen, Iisalmi (FI); Marko Halonen, Iisalmi (FI)

(73) Assignee: PONSSE OYJ, Vieremä (FI)

( * ) Notice: Subject to any disclaimer, the term of this patent is extended or adjusted under 35 U.S.C. 154(b) by 20 days.

(21) Appl. No.: 14/239,501

(22) PCT Filed: Jul. 26, 2012

(86) PCT No.: PCT/FI2012/050755
§ 371 (c)(1),
(2), (4) Date: Mar. 12, 2014

(87) PCT Pub. No.: WO2013/026951
PCT Pub. Date: Feb. 28, 2013

(65) Prior Publication Data
US 2014/0193231 A1    Jul. 10, 2014

(30) Foreign Application Priority Data
Aug. 19, 2011   (FI) .................................. 20115811

(51) Int. Cl.
*B66C 23/00*    (2006.01)
*B66F 9/00*     (2006.01)
*E02F 3/00*     (2006.01)
*A01G 23/00*    (2006.01)
*B66C 23/42*    (2006.01)

(52) U.S. Cl.
CPC .............. *A01G 23/00* (2013.01); *B66C 23/42* (2013.01)

(58) Field of Classification Search
CPC ............. E02F 3/34; E02F 3/38; E02F 3/627; A01G 23/00; B66C 23/42
USPC ....................................................... 414/722
See application file for complete search history.

(56) References Cited

U.S. PATENT DOCUMENTS

| | | | |
|---|---|---|---|
| 2,738,889 A | 3/1956 | Fritsch | |
| 3,227,295 A | 1/1966 | Hamilton et al. | |
| 4,293,270 A * | 10/1981 | Prime | E02F 3/32 212/231 |
| 4,808,061 A | 2/1989 | Cook et al. | |
| 4,968,213 A * | 11/1990 | Langenfeld et al. | 414/686 |
| 5,171,124 A | 12/1992 | Foster | |
| 5,261,780 A * | 11/1993 | Perry | 414/723 |
| 5,308,216 A | 5/1994 | Herolf | |
| 5,544,435 A * | 8/1996 | Somero | E02F 3/404 294/104 |
| 7,452,177 B2 * | 11/2008 | Gokita | E02F 3/301 414/685 |
| 7,832,128 B2 * | 11/2010 | Doucette | E02F 3/30 37/379 |
| 2003/0031547 A1 * | 2/2003 | Stumvoll et al. | 414/723 |

(Continued)

FOREIGN PATENT DOCUMENTS

| | | |
|---|---|---|
| FI | U950150 | 6/1995 |
| GB | 2 392 431 A | 3/2004 |
| SU | 169933 | 3/1964 |
| SU | 375054 | 3/1973 |

(Continued)

*Primary Examiner* — Stephen Vu
(74) *Attorney, Agent, or Firm* — Birch, Stewart, Kolasch & Birch, LLP

(57) ABSTRACT

A boom structure (2) on a work machine (1) including at least two boom branches (2a, 2b) and a main boom structure (2c) extending from their convergence area (4) substantially in a working direction. Thus the boom structure (2) provides a fork-like structure.

17 Claims, 3 Drawing Sheets

(56) References Cited

U.S. PATENT DOCUMENTS

2003/0118433 A1* 6/2003 Janes et al. .................... 414/722
2008/0023206 A1   1/2008 Rossi
2009/0134109 A1* 5/2009 Shimoie .................. E02F 3/301
                                                    212/347

FOREIGN PATENT DOCUMENTS

SU            978780        12/1982
WO       WO 87/07474 A1    12/1987
WO       WO 03/066981 A2    8/2003

* cited by examiner

BOOM STRUCTURE

BACKGROUND OF THE INVENTION

The invention relates to a boom structure on a work machine, the work machine comprising a cabin and the boom structure.

Various boom structures are employed on work machines for various purposes, generally for attaching various tools to the work machine, in particular, when tools need to be moved and they are required to have good reach in different directions even without relocating the work machine. These tools include, for instance, various lifters, grapples, buckets, cutting-off and/or cutting means and hammers. In forest work units, such as harvesters, forwarders or combinations thereof, boom structures are typically employed in connection with harvester heads used for wood handling, such as delimbing and cutting, and with grabs or grapples used for timber loading. Boom structures may be implemented in a variety of ways, typically, for instance, as articulated boom structures, by controlling movements of degrees of freedom through pressure-medium-operated actuators such as hydraulic cylinders. Often boom structures of this kind may also be called manipulators, particularly in connection with robotics.

On work machines the boom structures are typically placed either in front of the cabin, in other words between the cabin and the working area, or laterally to the cabin. However, both solutions limit the visibility of the machine operator working in the cabin over the working area, in many solutions to a significant extent. Consequently, attempts have been made to design the boom structures such that they limit the field of vision as little as possible, and additionally, the cabin may be arranged rotatable or otherwise movable in relation to the boom structure, whereby the visibility would be limited as little as possible. To arrange the boom structure laterally to the cabin also limits the reach of the boom structure, particularly to the opposite side of the cabin, as well as often limits the visibility considerably on the side of the boom structure and impedes the general stability of the work machine, in particular, in working stage, especially as the boom structure is subjected to powerful forces, for instance, in connection with the handling of heavy objects, and also sometimes in movement/transition stage, wherefore it often limits and controls working to be one-sided.

There are also known some solutions, in which the boom structure is placed behind the cabin in such a manner that the vertical pivoted axle of the boom structure is located behind the cabin in relation to the working direction, whereby the boom structure does not disturb the visibility in the working direction. In that case, however, some of the reach in the actual working direction is lost, and typically, in cabin design, particularly in defining the height of the cabin, it is necessary to pay attention to the limitations set by the boom structure stretching over the cabin. Direct rear visibility is naturally limited and forms a wide blind area. In addition, a rear overhang caused by the boom structure becomes large, especially if the boom structure is arranged to rotate on the same carrier structure with the cabin.

BRIEF DESCRIPTION OF THE INVENTION

There is now provided a novel and improved boom structure for a work machine.

The solution is characterized by what is defined in the independent claim. Some preferred embodiments of the invention are disclosed in the dependent claims.

The idea of the present solution is that the boom structure is provided to be fork-like, comprising two boom branches and a main boom structure. In that case it is possible to dimension the boom structure and the cabin of the work machine in such a manner that, at least in some use and/or transport positions, the boom branches are set on the opposite sides of the cabin, whereby the cabin will remain between the boom branches.

The present solution has an advantage that the height of the cabin may be maximized, as the height of the cabin need not unnecessarily be limited, for instance, because of the boom structure to be set above the cabin in a transport position. A further advantage of the solution is that the cabin, and particularly the seat of the work machine operator, can be arranged, in particular, in lateral direction close to the vertical rotating axis of the cabin, which considerably improves the working comfort, especially when the cabin is turned with respect to said axis. The solution also enables free visibility over a symmetrical and exceptionally wide area in comparison to known solutions. Further, the solution improves stability and symmetry of lifting force in the work machine, especially more uniform loading of a swivel, in particular when heavy loads are handled. Further still, the solution provides a safety-guard-type structure that protects the cabin. In other words, by means of the present solution it is possible to avoid many of the compromises required by the known solutions, for instance, regarding the user friendliness, stability and operating range of the work machine.

BRIEF DESCRIPTION OF THE FIGURES

Some embodiments of the invention will be explained in greater detail in the attached drawings, in which.

In the figures, some embodiments of the invention are shown simplified for the sake of clarity. Like reference numerals refer to like parts in the figures.

DETAILED DESCRIPTION

Figure 1:
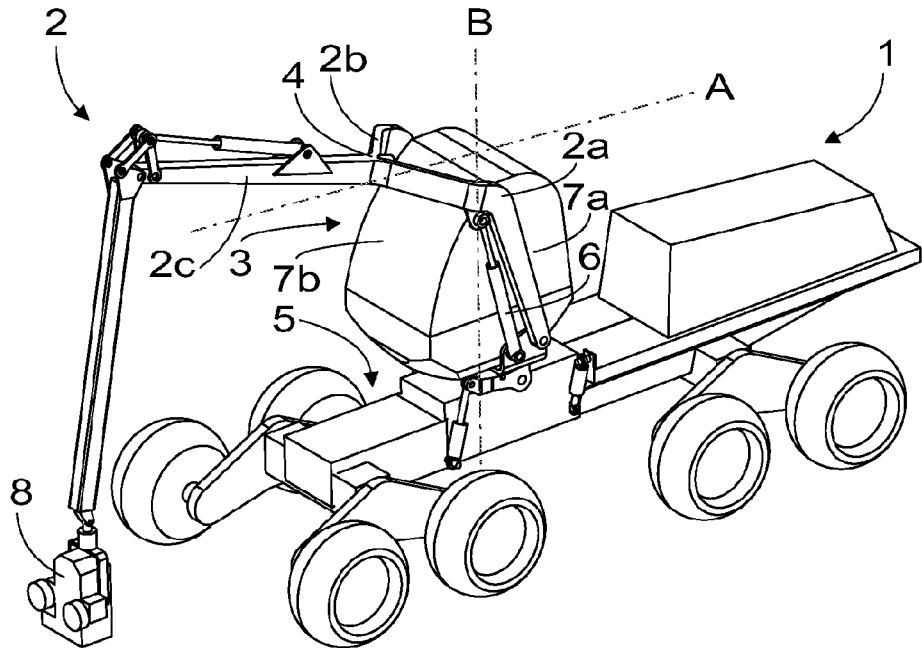
FIG. 1 is a schematic perspective view of a work machine in accordance with the invention.

The present solution for a boom structure is advantageous, for instance, in work machines whose tools need to reach out over a relatively large area surrounding the work machine, even on all sides of the work machine without relocating the work machine in the meantime, whereby working will be rapid and smooth. The solution is particularly well suited for work machines wherewith conditions in terrain, for instance, restrict the positioning of the work machine with respect to the working area and/or the selection of working directions. Examples of these work machines include various forest work units, such as harvesters, forwarders and combinations thereof.

With the present solution for a boom structure it is possible to implement a work machine having excellent visibility from the cabin both in each particular working direction as well as in other directions. This is particularly advantageous when the working area around the work machine may extend over a wide area of up to 360 degrees in the direction of rotational motion about the vertical axis of the cabin and when the work machine needs to be shifted without interrupting the work.

Further, the present solution for a boom structure allows implementation of a work machine whose operator may freely select the working method and working direction as the placement of the cabin and the boom structure does not restrict the reach on different sides of the machine, the stability of the machine when working on different sides of the machine or the visibility in different directions. The solution makes it also possible to optimize the path and reach of the boom structure in all use directions as well as the transport height and rear overhang of the machine, which are of importance to transport. In addition, by implementing the combination of the cabin and the boom structure in accordance with the present solution there is achieved the significant advantage in the driver's experience and ergonomics that the rotating axes of the driver's seat, the boom structure and the cabin may preferably be coaxial. Thus, when the boom structure and the cabin are turned, the driver is not exposed, in practice, to any translational movement at all, just to turning/rotational movement. Whereas, in a solution where the driver's seat is placed off the rotational axis, such as in a conventional excavator with a rotary carrier, the driver is in continuous rotational and translational motion as the boom structure of the machine turns, which is not necessarily pleasant, especially if this plane of motion cannot always be set in a substantially horizontal position due to highly sloping terrain, for instance.

In this description, the working area refers to the area where the work machine and/or tools attached thereto are to be moved and employed. The working direction refers to the direction or sector in which the working is mainly directed or directable with relation to the operating site of the work machine, e.g. the cabin.

In this description the use position refers to a position or location, in which the work machine and/or tools or other means arranged thereto can be used. In this application the transport position refers to a position in which the work machine is arranged for transport on a carriage or for other corresponding transit. The transport of work machines, especially their road transport, is constrained by various needs, requirements and regulations originating from e.g. transport vehicles, transport routes and obstacles locating thereon and hampering the passage, such as underpasses and overhead power lines extending over the transport route, vegetation and the like, other traffic, rules and regulations of the authorities and the like. These factors may often limit, for instance, the allowed transport height or width and/or rear overhang, or exceeding of these limits may require special arrangements for transport.

FIG. 1 is a perspective view of a work machine 1 that comprises a boom structure 2 and a cabin 3. The boom structure 2 may comprise a first boom branch 2a and a second boom branch 2b, which are arranged in the work machine 1, and a main boom structure 2c extending from a convergence area 4 of the boom branches 2a, 2b to a working direction. The boom structure 2 thus forms a fork-like structure that in this description is called a branched boom structure, or simply a boom structure. The main boom structure 2c of the branched boom configuration may have, for instance, a sliding boom structure, a path boom structure or any boom structure known per se. Depending on the work machine 1, the use and the situation, it is possible to attach to the main boom structure 2c one or more tools 8, such as a lifter, a grapple, a bucket, a cutting off device and/or a cutting device and a hammer or any other appropriate tool, or a combination thereof. In different embodiments the number of boom branches 2a, 2b may be exactly two, or more than two.

In the present solution a boom structure, such as the boom structure 2 and/or the main boom structure 2c, may comprise one or more booms and other components known per se, which may be interconnected in a manner known per se. Likewise, other components and parts set forth, such as booms and boom branches 2a, 2b, may comprise one or more components, which may be interconnected in a manner known per se.

Figure 6:
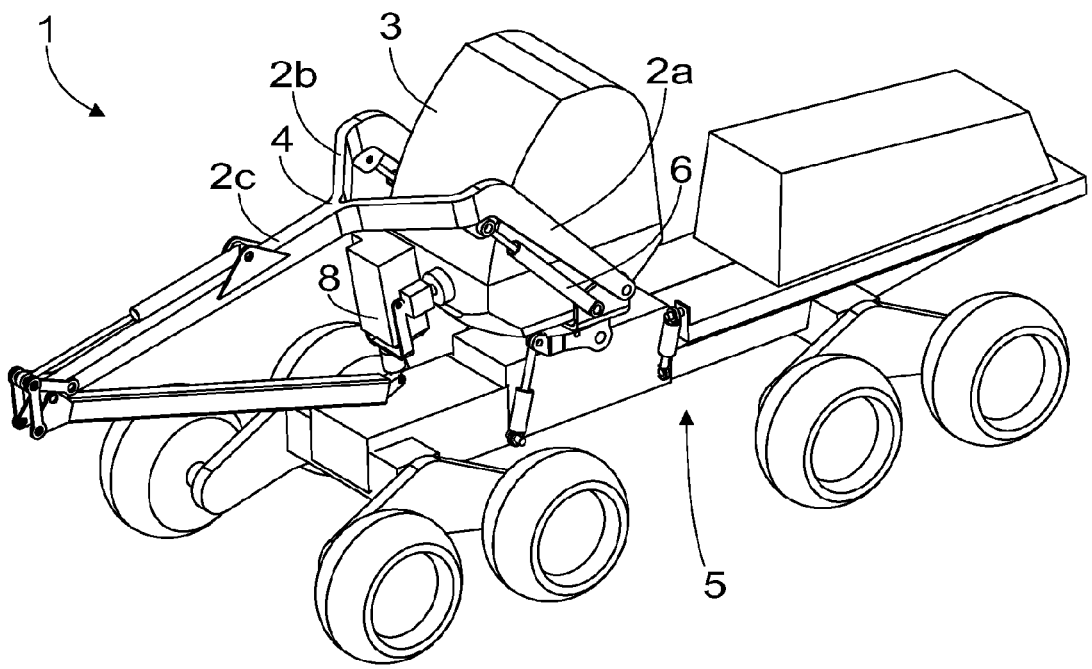
FIG. 6 is a schematic perspective view of a work machine in accordance with the invention in a transport position.

Preferably the branched boom structure may be arranged with respect to the cabin 3 of the work machine 1 such that the direction of the main boom structure 2c, i.e. the working direction, is substantially parallel with the centre line A of the cabin, seen from above the cabin 3 and the work machine 1. Preferably the boom branches 2a, 2b, their convergence area 4 and/or the main boom structure 2c may be arranged, at least in transport position, in the vicinity of the cabin, particularly preferably in the transport position at least partly in front of the cabin. FIG. 6 shows a work machine 1 in transport position.

Preferably the boom branches 2a, 2b and/or the convergence area 4 thereof may also be arranged to extend from the main boom structure 2c in the opposite direction to the working direction and downwardly towards the frame 5, laterally to the cabin 3, and they may extend, at least in some use or transport positions, at least partly to the rear side of the cabin, seen from the working direction. In other words, the boom branches 2a, 2b may extend, at least in transport position, from the main boom structure 2c towards the frame 5 of the work machine in the vicinity of the cabin 3, particularly in the vicinity of the planes formed by side walls 7a, 7b of the cabin 3, on different sides of the centre line A of the cabin. In that case each boom branch 2a, 2b may comprise a part substantially parallel with the main direction of the main boom structure 2c, i.e. the centre line A of the cabin 3, and a part at an angle thereto, orienting towards the frame 5. In view of the strength of the boom structure 2 it may be advantageous that said part of the boom branches 2a, 2b that is parallel with the main boom structure 2c and said part orienting substantially towards the frame 5 provide a continuous, preferably arcuate side profile, for instance, as appears in FIG. 2. Preferably, in the boom branches 2a, 2b between said part substantially parallel with the main direction of the main boom structure 2c and said part orienting towards the frame 5 there will be formed an angle of about 70 to 110 degrees, most preferably about 90 degrees. Preferably the boom branches 2a, 2b may be placed symmetrically to the centre line A of the cabin. In different embodiments the convergence area 4 of the boom branches 2a, 2b and the main boom structure 2c may be substantially Y-shaped or T-shaped seen from above the work machine 1. It should be noted that in different embodiments of the present work machine 1 the boom branches 2a and 2b as well as the main boom structure 2c refer to the operational parts of the boom structure 2 which are described in connection with the embodiments and which may consist of one or more structural parts in each particular case. Likewise, the lines between said structural parts and operational parts are not necessarily equal, whereby, for instance, both boom branches 2a and 2b as well as the main boom structure 2c, or a part thereof, may consist of one or more, substantially continuous, preferably rigid structural parts. In some embodiments the boom branches 2a and 2b, or at least part of the boom branches 2a and 2b, for instance, the part of the boom branches 2a and 2b substantially parallel with the main direction of the main boom structure 2c, and at least part of the main boom structure 2c may form a substantially integral structure, for instance, such that said parts are not substantially movable in relation to one another.

The described boom structure is extremely advantageous, because by means thereof it is possible to arrange very good, if not quite free, visibility from the cabin, in practice, over the entire working area, an extensive working area, a wide-ranging path for the boom structure 2 and good stability of the work machine during operation. Particularly preferably, in that case the boom structure 2 may be utilized as part of the safety structure of the cabin 3 that protects the cabin 3 in unexpected situations.

In different embodiments, the boom branches 2a, 2b may be attached behind the cabin 3 on the work machine 1, in connection with the cabin 3, i.e. on the opposite side of the cabin 3 in view of the working direction of the boom structure 2 and/or laterally to the cabin 3 in view of the working direction of the boom structure 2. In some embodiments the boom branches 2a, 2b may also be arranged in front of the cabin 3 on the work machine 1, i.e. on the working direction side in view of the cabin 3. In different embodiments, the boom branches 2a, 2b may be arranged, for instance, in connection with the cabin 3, such as in the cabin module structures of the work machine 1 or in the same mounting structure with the cabin 3, or in the frame of the work machine 1. Preferably the boom branches 2a, 2b may be arranged substantially symmetrically to the vertical centre line B of the cabin 3, seen from behind the cabin 3.

Figure 2:
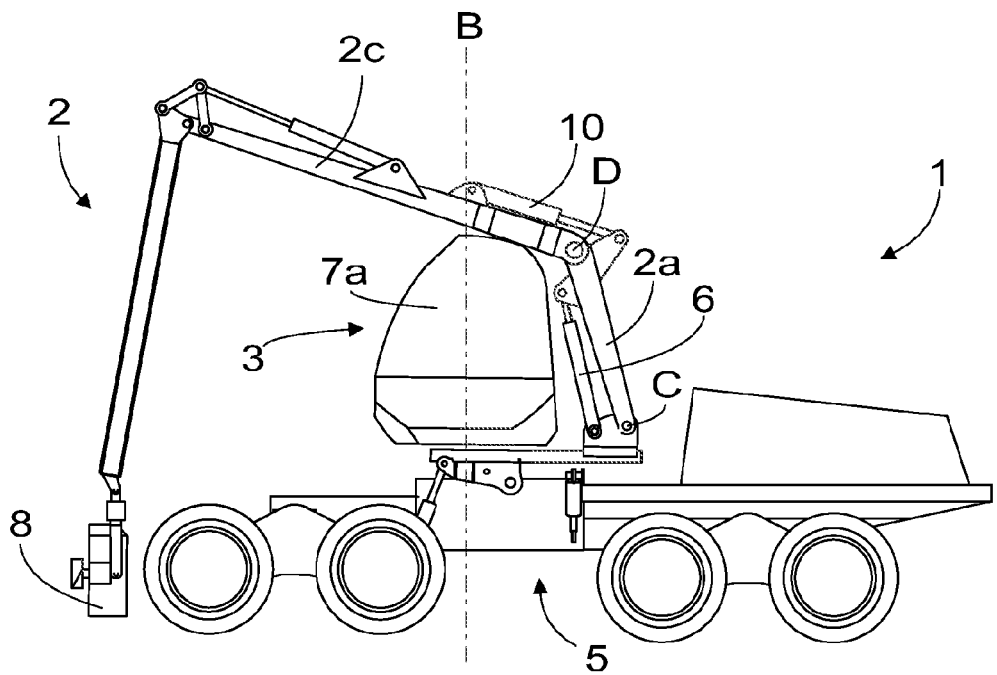
FIG. 2 is a schematic side view of a work machine in accordance with the invention.
Figure 3:
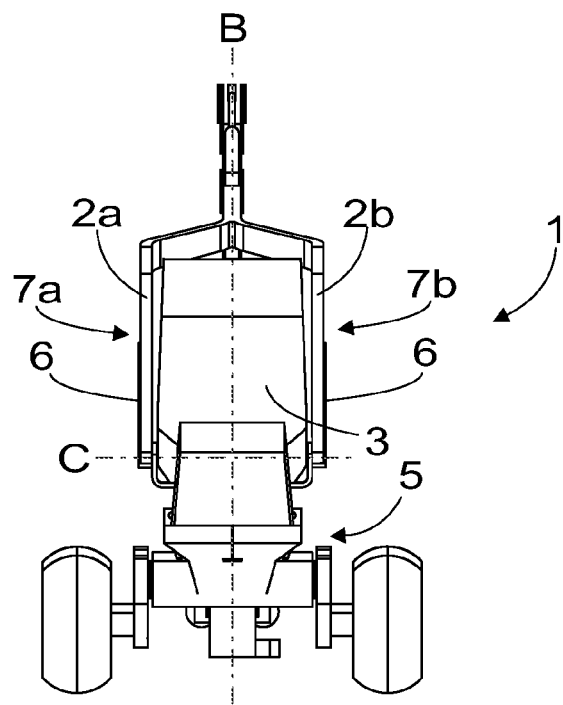
FIG. 3 is a schematic rear view of a work machine in accordance with the invention.

FIG. 2 is a side view of a work machine 1 and FIG. 3 is a rear view of another work machine 1. In the embodiments of the figures, the boom structure 2 and the cabin 3 are configured such that the boom structure may be turned in relation to an axis C perpendicular to the working direction. In that case the boom branches 2a, 2b may turn at least partly onto the area of the side walls 7a, 7b of the cabin 3 at least in one use or transport position of the work machine 1. In other words, for instance, when the boom structure 2 stretches out in the direction of the working area, the cabin 3 may be enclosed at least partly within a partial framed structure formed by the boom branches 2a and 2b. This structure may enable extensive paths for the boom structure 2 and a minimized transport height. The boom structure 2 may be turned with at least one actuator 6, for instance, in relation to the axis C. The actuator 6 may be e.g. a pressure-medium cylinder, such as a hydraulic cylinder. In different embodiments, the actuator 6, e.g. a cylinder, may be arranged on other side of the boom branch 2a, 2b than the one shown in FIG. 2, whereby the actuator 6 may be arranged to pull the boom structure 2 upwardly and to push it downwardly. The presented structure enables advantageous dimensioning and/or placing for the actuator or the actuators 6.

In FIG. 2, the lower pivot of the boom structure 2, i.e. the axis C perpendicular to the working direction, is arranged in the work machine 1 behind the vertical centre line B of the cabin 3, in the embodiment of FIG. 2 even behind the cabin 3, i.e. on the opposite side to the working direction. In different embodiments, said axis C may be arranged in the work machine 1, for instance in the cabin 3, the cabin module 5 or frame 5 at different locations, depending on the overall structure of the work machine 1 and the boom structure 2, the use and other corresponding factors, for instance, laterally to the cabin 3 or in front of the cabin 3. By appropriate placement of the boom structure pivot, i.e. axis C, it is possible to affect lateral visibility, reach of the boom structure 2 and transport position, for instance.

In the embodiment of FIG. 2, the boom structure 2 also comprises at least one folding link D that enables turning of the first part of the boom structure 2, which comprises at least the main boom structure 2c, in relation to the second part of the boom structure 2, which comprises at least part of the boom branches 2a, 2b. In that case the boom structure 2 is preferably equipped with at least one actuator 10 for controlling the folding link D, i.e. for folding the first part of the boom structure 2 at the folding link D, in relation to the second part of the boom structure 2.

Figure 4:
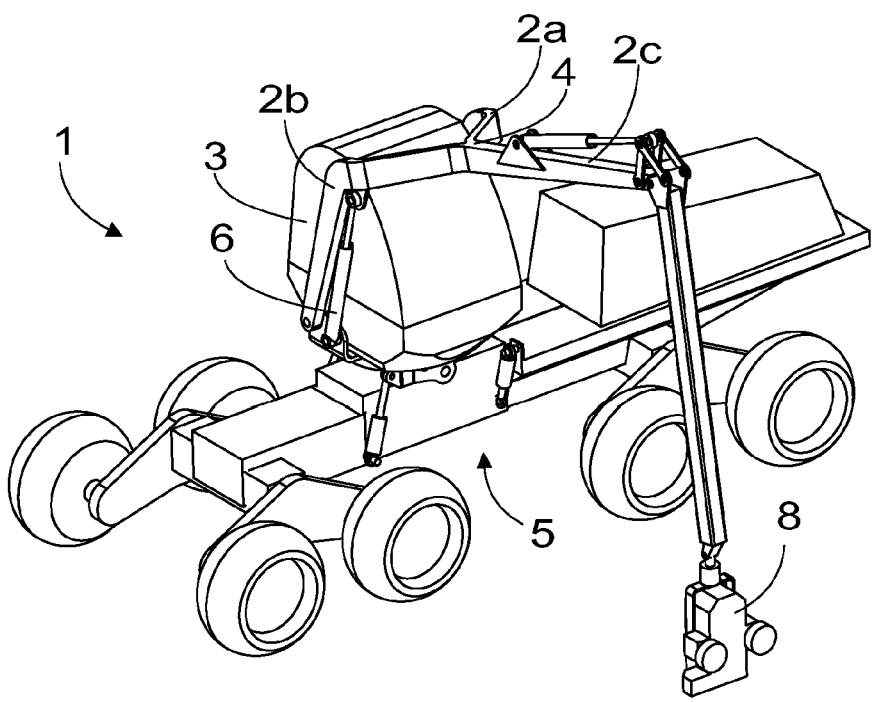
FIG. 4 is a schematic perspective view of a work machine in accordance with the invention in a use position.

FIG. 4 shows a work machine 1 in a use position. As appears from the figure, the boom structure 2 may be rotatable, preferably about a substantially vertical axis, in a desired direction in relation to the frame 5 of the work machine. In that case the boom structure 2 as a whole may be pivoted directly or indirectly to the frame 5 of the work machine with a pivoted structure of at least one degree of freedom, which enables rotation of the boom structure 2 as a whole in relation to the frame 5 of the work machine, preferably about a substantially vertical axis. Particularly preferably the cabin 3 of the work machine 1 may be rotatable at least partly about its vertical axis, which is known per se and for the implementation of which there are known a variety of solutions. In that case a branched boom structure may be arranged in connection with the cabin 3 such that the branched boom structure rotates in a synchronized manner with the cabin such that the centre line A of the cabin and the main direction of the main boom structure 2c remain substantially parallel, as shown in the figure. In other words, the boom structure 2 thus rotates in such a manner that both the main boom structure 2c and the cabin 3, or to put it more precisely, its centre line A, turn in the particular working direction. This solution provides excellent visibility in the working direction over the entire working area. Naturally, in different embodiments the boom structure 2 and the cabin 3 may also be separately rotatable.

Figure 5:
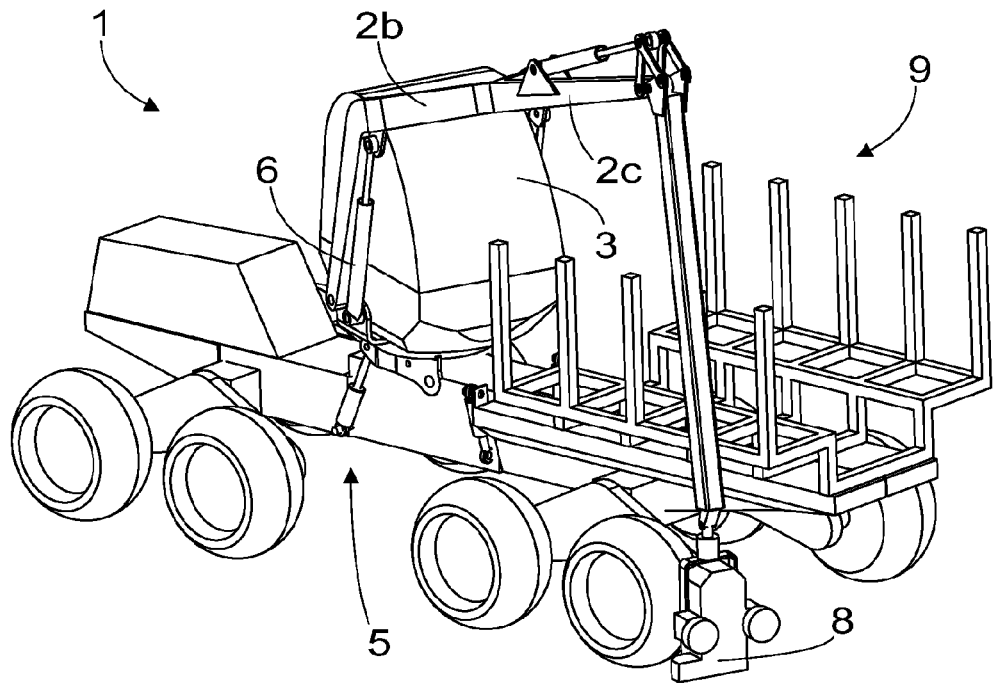
FIG. 5 is a schematic perspective view of a work machine in accordance with the invention.

In the embodiment of FIG. 5 the work machine 1 is a combination of a forwarder and a harvester, i.e. a so-called combination machine. In that case the work machine 1 may comprise a cargo space 9 for timber loading. In that case a tool 8 arranged in the main boom structure 2c may also be a timber grapple by means of which it is possible to lift timber into the cargo space 9. In particular, in the case of the combination machine said tool may include functions intended both for loading and for other wood handling, such as delimbing and cutting, at the same time. In different embodiments the work machine 1 may also be a forwarder, for instance.

FIG. 6 shows a work machine 1 in its transport position. In the embodiment of FIG. 6, the boom structure 2 and the cabin 3 are provided such that the boom structure 2 does not increase the transport height of the work machine 1, because the boom structure 2 will remain completely at a lower level than the highest point of the cabin 3. This may be implemented by designing the structure of the cabin 3 and the boom structure 2 such that when the boom structure 2 is collapsed to transport position the boom branches 2a, 2b will incline on the sides of the cabin 3 while the cabin 3 remains in the space formed therebetween. In the embodiment of FIG. 6 the boom branches 2a, 2b thus extend onto the sides of the cabin 3 also in their transport position. In different embodiments the cabin 3 and the boom structure 2 are preferably provided such that, at least in the transport position, the upper surface of the cabin is at least partly higher up than the highest point of the lower surface of the boom structure 2.

In different embodiments the boom structure 2 and the cabin 3 may also be provided such that the boom structure 2 and/or part of the cabin 3, or equipment thereof, e.g. the operator's seat of the work machine 1, are rotatable in a synchronized manner or separately in a desired direction, typically in the working direction. In that case the frame of the cabin 3 may be stationary and arranged fixedly to the frame of the work machine 1, for instance, whereby just the operator's seat, preferably with optional controls, and the boom structure 2 rotate in the working direction. In different embodiments the boom structure 2, the cabin 3 and/or the operator's seat, or some of them, may be arranged to rotate together or separately, at the same or different speeds, or in the same or different directions. In that case, if so desired, the cabin or the operator's seat, for instance, may be isolated from the motion of the boom structure so as to avoid unnecessary accelerations exerted on the driver. Typically, minor rotational movements of the boom structure 2 do not necessarily require that the cabin 3 and/or the driver's seat be rotated to maintain good visibility in the working direction. Additionally or alternatively, the rotational movement of the cabin 3 or the driver's seat in relation to the rotational movement of the boom structure 2 may be damped or delayed also when it is necessary to turn the cabin 3 or the driver's seat in the rotating direction of the boom structure 2.

In some cases, features disclosed in this application may be used as such, regardless of other features. On the other hand, when necessary, features disclosed in this application may be combined in order to provide various combinations.

The drawings and the related description are only intended to illustrate the idea of the invention. Details of the invention may vary within the scope of the claims.

The invention claimed is:

1. A boom structure on a work machine, the work machine comprising a cabin and a boom structure, the boom structure is a branched boom structure that comprises at least two boom branches arranged on the work machine and a main boom structure extending from a convergence area of said boom branches substantially in a working direction, wherein the boom structure is rotatable in relation to a frame of the work machine about a substantially vertical axis,
the boom branches are arranged on the work machine substantially in a vicinity of planes formed by side walls of the cabin,
each of the boom branches is arranged to extend at least partly to an area of one of the corresponding side walls of the cabin in at least one use or transport position of the work machine,
the boom structure is turnable in relation to an axis perpendicular to both the working direction and the vertical axis, and
the boom branches and at least part of the main boom structure constitute a substantially continuous structure in a such a manner that the boom branches and said at least part of the main boom structure are not substantially movable in relation to one another.

2. The boom structure of claim 1, wherein the boom branches are arranged substantially symmetrically to a centre line and a vertical centre line of the cabin.

3. The boom structure of claim 2, wherein the boom structure comprises at least one folding link which enables turning of a first part of the boom structure, which comprises at least the main boom structure, in relation to a second part of the boom structure, which comprises at least part of the boom branches, and an actuator for controlling the folding link.

4. The boom structure of claim 1, wherein the cabin is rotatable at least partly about its vertical axis and the boom structure is arranged in connection with the cabin such that the boom structure rotates in a synchronized manner with the cabin such that the centre line of the cabin and the direction of the main boom structure remain substantially parallel.

5. The boom structure of claim 4, wherein the boom structure comprise at least one folding link which enables turning of a first part of the boom structure, which comprises at least the main boom structure, in relation to a second part of the boom structure, which comprises at least part of the boom branches, and an actuator for controlling the folding link.

6. The boom structure of claim 1, wherein the axis perpendicular to the working direction and the vertical axis is arranged in the work machine to be behind the vertical centre line of the cabin.

7. The boom structure of claim 6, wherein the boom structure comprises at least one actuator for rotating the boom structure in relation to said axis perpendicular to both the working direction and the vertical axis.

8. The boom structure of claim 1, wherein the boom structure comprises at least one actuator for rotating the boom structure in relation to said axis perpendicular to both the working direction and the vertical axis.

9. The boom structure of claim 1, wherein each boom branch comprises a part substantially parallel with a main direction of the main boom structure and a part at an angle thereto and orienting substantially towards the frame.

10. The boom structure of claim 9, wherein in the boom branches between said part substantially parallel with the main direction of the main boom structure and said part orienting substantially towards the frame there is formed an angle of about 70 to 110 degrees.

11. The boom structure of claim 1, wherein the boom structure comprises at least one folding link which enables turning of a first part of the boom structure, which comprises at least the main boom structure, in relation to a second part of the boom structure, which comprises at least part of the boom branches, and an actuator for controlling the folding link.

12. The boom structure of claim 1, wherein the boom structure comprises at least one folding link which enables turning of a first part of the boom structure, which comprises at least the main boom structure, in relation to a second part of the boom structure, which comprises at least part of the boom branches, and an actuator for controlling the folding link.

13. The boom structure of claim 1, wherein the work machine is a forest work unit.

14. The boom structure of claim 1, wherein the boom branches are constrained to only be turnable about said axis perpendicular to both the working direction and the vertical axis while the boom structure remains rotatable in relation to the frame of the work machine about said vertical axis.

15. The boom structure of claim 1, wherein said axis perpendicular to both the working direction and the vertical axis passes through the cabin.

16. The boom structure according to claim 1, wherein the at least two boom branches includes a first boom branch and a second boom branch, and wherein the first boom branch and the second boom branch are arranged such that the cabin is located between the first boom branch and the second boom branch.

17. The boom structure of claim 1, wherein the boom branches are arranged to such that that the planes formed by the side walls are located between the boom branches in the at least one use or transport position of the work machine.

* * * * *